US008946360B2

United States Patent
Chiefari et al.

(10) Patent No.: US 8,946,360 B2
(45) Date of Patent: Feb. 3, 2015

(54) CONTINUOUS FLOW POLYMERISATION PROCESS

(75) Inventors: John Chiefari, Heathmont (AU); Christian Hornung, St Kilda (AU); Simon Saubern, Clifton (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 13/825,530

(22) PCT Filed: Aug. 12, 2011

(86) PCT No.: PCT/AU2011/001035
§ 371 (c)(1),
(2), (4) Date: Apr. 9, 2013

(87) PCT Pub. No.: WO2012/037596
PCT Pub. Date: Mar. 29, 2012

(65) Prior Publication Data
US 2013/0217841 A1 Aug. 22, 2013

(30) Foreign Application Priority Data
Sep. 22, 2010 (AU) .................................. 2010904286

(51) Int. Cl.
*C08F 2/00* (2006.01)
*C08F 4/00* (2006.01)
(Continued)

(52) U.S. Cl.
CPC .................. *C08F 2/01* (2013.01); *B01J 19/242* (2013.01); *B01J 19/243* (2013.01); *C08F 2/38* (2013.01);
(Continued)

(58) Field of Classification Search
CPC ......... B01J 19/242; B01J 19/243; C08F 2/01; C08F 2/38; C08F 120/56; C08F 293/005; C08F 120/54; C08F 220/54; C08F 4/00; C08F 2438/03
USPC ............................................ 526/64, 235, 234
See application file for complete search history.

(56) References Cited

U.S. PATENT DOCUMENTS

| 6,716,935 B1 * | 4/2004 | Nelson et al. .................... 526/64 |
| 2006/0142404 A1 * | 6/2006 | Berge et al. .................... 521/142 |
| 2011/0136963 A1 | 6/2011 | Couvreur |

FOREIGN PATENT DOCUMENTS

| WO | WO 98/01478 | 1/1998 |
| WO | WO 99/31144 | 6/1999 |

(Continued)

OTHER PUBLICATIONS

Christina Diehl et al., "Accelerated Continuous Flow RAFT Polymerization," Macromolecules, vol. 43, No. 24, pp. 10311-10314, published on Web Dec. 3, 2010.*
(Continued)

*Primary Examiner* — William Cheung
(74) *Attorney, Agent, or Firm* — Davis Wright Tremaine LLP (57) ABSTRACT

The present invention relates to a process for continuously preparing polymer by RAFT solution polymerization, the process comprising: introducing into a flow reactor a reaction solution comprising one or more ethylenically unsaturated monomers, RAFT agent, non-reactive solvent and free radical initiator; and promoting RAFT polymerization of the one or more ethylenically unsaturated monomers within the reactor so as to form a polymer solution that flows out of the reactor.

13 Claims, 4 Drawing Sheets

(51) Int. Cl.

| | | |
|---|---|---|
| *C08F 4/32* | (2006.01) | |
| *C08F 2/01* | (2006.01) | |
| *B01J 19/24* | (2006.01) | |
| *C08F 2/38* | (2006.01) | |
| *C08F 293/00* | (2006.01) | |
| *C08F 120/54* | (2006.01) | |
| *C08F 220/54* | (2006.01) | |
| *C08F 120/56* | (2006.01) | |

(52) U.S. Cl.
CPC ............. *C08F 4/00* (2013.01); *C08F 293/005* (2013.01); *C08F 120/54* (2013.01); *C08F 220/54* (2013.01); *C08F 120/56* (2013.01); *C08F 2438/03* (2013.01)
USPC .............................. 526/64; 526/235; 526/234

(56) References Cited

FOREIGN PATENT DOCUMENTS

| WO | WO 01/77198 | 10/2001 |
|---|---|---|
| WO | WO 2004/060927 | 7/2004 |
| WO | WO 2008/103144 | 8/2008 |
| WO | WO 2008/148200 | 12/2008 |
| WO | WO 2009/121911 | 10/2009 |
| WO | WO 2010-018344 | 2/2010 |
| WO | WO 2010/83569 | 7/2010 |

OTHER PUBLICATIONS

Moad G.; Rizzardo, E; Thang S, *H. Polymer* 2008, 49: 1079-1131.
Rosenfeld D. et al., "Influence of micromixer characteristics" *Lab Chip*, 2008, 8:1682-1687.
PCT Written Opinion of the International Searching Authority in corresponding Application No. PCT/AU2011/001035, mailed on Oct. 20, 2011, 5 pages.
PCT International Search Report corresponding to Application No. PCT/AU2011/001035, 4 pages.
Russum, J. P. et al. "Continuous Living Polymerization in Miniemulsion Using Reversible Addition Fragmentation Chain Transfer (RAFT) in a Tubular Reactor" *Ind. Eng. Chem. Res.*, 2005, 44, pp. 2484-2493.
Smulders, W. W et al., "Synthesis of Block Copolymers Using RAFT Miniemulsion Polymerization in a Train of CSTRs", *Macromolecules*, 2004, vol. 37, pp. 9345-9354.
Wilms D. et al., "Nicrostructured Reactors for Polymer", *Macromol, Chem. Phys*, 2008, 209:343-356.
Christina Diehl et al., "Accelerated Continuous Flow RAFT Polymerization," *Macromolecules*, vol. 43, No. 24, pp. 10311-10314 (Dec. 3, 2010).

* cited by examiner

CONTINUOUS FLOW POLYMERISATION PROCESS

CROSS-REFERENCE TO RELATED APPLICATIONS

The present application is a U.S. National Stage entry under 35 U.S.C. §371 of International Application No. PCT/AU2011/001035, filed on 12 Aug. 2011, designating the United States of America and published in English on 29 Mar. 2012, which in turn claims priority to Australian Patent Application No. 2010904286, filed on 22 Sep. 2010, each of which is hereby incorporated by reference in its entirety.

FIELD OF THE INVENTION

The present invention relates in general to a continuous flow polymerisation process. In particular, the invention relates to a process for continuously preparing polymer by Reversible Addition-Fragmentation chain Transfer (RAFT) polymerisation.

BACKGROUND OF THE INVENTION

RAFT polymerisation, as described in International Patent Publication Nos. WO 98/01478, WO 99/31144 and WO 10/83569, is a polymerisation technique that exhibits characteristics associated with living polymerisation. Living polymerisation is generally considered in the art to be a form of chain polymerisation in which irreversible chain termination is substantially absent. An important feature of living polymerisation is that polymer chains will continue to grow while monomer and the reaction conditions to support polymerisation are provided. Polymers prepared by RAFT polymerisation can advantageously exhibit a well defined molecular architecture, a predetermined molecular weight and a narrow molecular weight distribution or low polydispersity.

RAFT polymerisation is believed to proceed under the control of a RAFT agent according to a mechanism which is simplistically illustrated below in Scheme 1.

its ability to be performed using a vast array of monomers and solvents, including aqueous solutions.

Despite the advantages afforded by RAFT polymerisation, there has been limited research and development to date into processes for preparing commercial scale quantities of so called RAFT polymer (i.e. polymer formed by RAFT polymerisation). Accordingly, there remains an opportunity to develop a process for producing RAFT polymer in commercial quantities, or to at least to develop a useful alternative process for preparing RAFT polymer compared with state of the art processes.

SUMMARY OF THE INVENTION

The present invention therefore provides a process for continuously preparing polymer by RAFT solution polymerisation, the process comprising:
introducing into a flow reactor reaction solution comprising one or more ethylenically unsaturated monomers, RAFT agent, non-reactive solvent and free radical initiator; and
promoting RAFT polymerisation of the one or more ethylenically unsaturated monomers within the reactor so as to form a polymer solution that flows out of the reactor.

By the present invention, reaction solution can be continuously introduced into the flow reactor and converted therein into a polymer solution that in turn can continuously flow out of the reactor. The continuous nature of the process advantageously enables RAFT polymer to be produced in commercial quantities. The process is reproducible and consistently provides low polydisperse, high purity polymer.

In one embodiment, the flow reactor is a continuous stirred tank reactor (CSTR).

In another embodiment, the flow reactor is a tubular flow reactor.

In another embodiment, the flow reactor is a microfluidic flow reactor.

In a further embodiment, the flow reactor is a capillary tubular flow reactor (also referred to as a microcapillary flow reactor).

Despite the "micro-scale" of such flow reactors, they can readily be operated with multiple flow lines making the scale Scheme 1: Proposed mechanism for RAFT polymerisation, where M represents monomer, $P_n$ represents polymerised monomer, and Z and R are as defined below.

propagating radical     RAFT agent     RAFT-adduct radical     macro-RAFT agent     leaving group With reference to Scheme 1, R represents a group that functions as a free radical leaving group under the polymerisation conditions employed and yet, as a free radical leaving group, retains the ability to reinitiate polymerisation. Z represents a group that functions to convey a suitable reactivity to the C=S moiety in the RAFT agent towards free radical addition without slowing the rate of fragmentation of the RAFT-adduct radical to the extent that polymerisation is unduly retarded.

RAFT polymerisation is one of the most versatile methods of controlled radical polymerisation at least in part because of up to large production quantities relatively straight forward. In particular, it can be more effective and efficient to "number-up" (i.e. scale up through repetition or replication) such micro-flow lines to produce a given quantity of polymer compared with developing a single macro-flow line to produce the same amount of polymer. For example, a microfluidic flow reactor for producing 0.2 g of polymer can be readily be "numbered up" to produce, 2 g, 20 g, 200 g or 2 kg etc of polymer.

In one embodiment, the flow reactor is a tubular flow reactor constructed of metal, for example stainless steel.

Further aspects of the invention are described in more detail below.

BRIEF DESCRIPTION OF THE DRAWINGS

The invention will also be described herein with reference to the following non-limiting drawings in which.

DETAILED DESCRIPTION OF THE INVENTION

Polymer is prepared according to the invention by RAFT solution polymerisation. By "solution polymerisation" is meant a polymerisation technique where monomer that is dissolved in non-reactive solvent undergoes polymerisation to form polymer that is itself also dissolved in the non-reactive solvent (i.e. forms a polymer solution). The so formed polymer solution may have utility in its own right, or the polymer may be isolated from the non-reactive solvent for subsequent use.

Those skilled in the art will appreciate that solution polymerisation is a different polymerisation technique to emulsion or suspension polymerisation. The latter two polymerisation techniques typically utilise a continuous aqueous phase in which is dispersed a discontinuous organic phase comprising monomer. Upon promoting polymerisation of monomer within the dispersed phase, the techniques afford an aqueous dispersion of polymer particles or latex. Unlike solution polymerisation, polymer formed by emulsion and suspension polymerisation is not soluble in the liquid reaction medium.

Despite being useful under certain circumstances, emulsion and suspension polymerisation techniques require the use of surfactants and other polymerisation adjuvants which remain in the resulting polymer and are difficult to remove. Furthermore, if the resulting polymer is to be isolated from the aqueous dispersion, separation of water from the polymer is an energy intensive process.

In contrast, solution polymerisation does not require the use of surfactants or polymerisation adjuvants, and if required the non-reactive solvent used may be selected to facilitate its ease of separation from the resulting polymer.

Having said this, production of commercial quantities of polymer using solution polymerisation techniques can be problematic. For example, solution polymerisation conducted batch-wise can present difficulties in terms of ensuring the reaction components are adequately mixed, and also in terms of controlling the temperature of the reaction solution. The batch-wise methodology is volume limited, inflexible, requires highly efficient mixing and heat transfer to achieve good conversions and high yields. By conducting a polymerisation "batch-wise" is meant that the reaction solution comprising the required reagents is charged into a reaction vessel, polymerisation of the monomer is promoted so as to form the polymer solution, and the polymer solution is subsequently removed from the reaction vessel. The process can be repeated by again charging the reaction vessel with the reaction solution and so on.

In contrast, the present invention makes use of a flow reactor. By a "flow reactor" is meant that the reactor has an appropriate geometry to enable (1) the reaction solution to be continuously introduced into and undergo polymerisation within the reactor, and (2) the resulting polymer solution to correspondingly flow continuously out from the reactor. Such reactors are sometimes referred to in the art as a "continuous flow reactors".

There is no particular limitation regarding the type of flow reactor that can be used in accordance with the invention.

In one embodiment, the flow reactor may be in the form of a continuous stirred tank reactor (CSTR, sometimes referred to as a continuous flow stirred tank reactor). In such an embodiment, reaction solution can be continuously introduced into a tank (or vessel) in which the reaction solution is stirred. Polymerisation may then be promoted within the tank, and the tank is configured such that polymer solution can flow out from the tank.

The flow reactor may also be of a type that comprises one or more so called "flow lines". By a "flow line" is meant a channel, capillary or tube through which the reaction solution may flow.

So called "microfludic" flow reactors are flow reactors in which the flow lines that form the reactor typically have an internal width or diameter of less than about 1000 μm and more than about 10 μm.

Provided that the solution polymerisation can be performed, there is no particular limitation concerning the dimensions of a flow line of the reactor.

In one embodiment, the flow reactor is in the form of a microfluidic flow reactor.

In one embodiment, the flow reactor is in the form of a continuous flow chip reactor. In such an embodiment, one or more channels may be carved (e.g. etched) into the surface of a suitable substrate (e.g. glass, metal, or polymer) and the channel covered with a suitable substrate (e.g. glass, metal, or polymer) so at to form the flow lines of the reactor. Reaction solution can be continuously introduced into the flow line(s). Polymerisation may then be promoted within the flow lines that make up the reactor, and the chip is configured such that polymer solution can flow out from the reactor.

In another embodiment, the flow reactor is in the form of a tubular flow reactor. In such an embodiment, one or more tubes of a suitable substrate (e.g. glass, metal, or polymer) form the flow lines of the reactor. Reaction solution can be continuously introduced into the flow line(s). Polymerisation may then be promoted within the flow lines that make up the reactor, and the one or more tubes are configured such that polymer solution can flow out from the reactor.

The tubular flow reactor may be a capillary tubular flow reactor. The internal diameter of a flow tube that forms such flow reactors may range between 10 and 1,000 μm. A particular advantage offered by such flow reactors is their high surface area to volume ratio which can range from about 10,000 to about 50,000 $m^2/m^3$. This contrasts significantly with the surface area to volume ratio provided by conventional batch reactors which is usually in the order of about 100 $m^2/m^3$ and seldom exceeds 1,000 $m^2/m^3$. As a result of their high surface area to volume ratio, such flow reactors offer excellent heat transfer across the flow line wall, allowing for efficient and fast cooling of exothermic reactions and quasi-isothermal process control of slower reactions which are mildly exo- or endothermic.

In one embodiment, the tubular flow reactor comprises one or more flow lines having and internal diameter of no more than about 2 mm, for example of no more than about 1.5 mm, or no more than about 1 mm. In a further embodiment the tubular flow reactor comprises one or more flow lines having and internal diameter ranging from about 0.5 mm to about 1.5 mm, or about 0.8 mm to about 1.2 mm. In yet a further embodiment the tubular flow reactor comprises one or more flow lines having and internal diameter of about 1 mm.

Conventional flow reactors used within the wider chemical manufacturing industry can advantageously be used in accordance with the invention.

Further details relating to flow reactors suitable for use in accordance with the invention may be found in Hessel V., Hardt S., Löwe H., 2004, *Chemical Micro Process Engineering* (1), *Fundamentals, Modelling and Reactions*, Wiley-VCH, Weinheim, Germany, and T. Wirth, 2008, *Microreactors in Organic Synthesis and Catalysis*, Wiley-VCH, Weinheim.

The flow reactor may be provided with one or more flow lines. In the case of microfluidic type flow reactors, multiple flow lines will generally be used in order to provide for the desired throughput. For example, in the case of tubular type flow reactors multiple flow lines may be bundled or coiled, and in the case of chip type flow reactors multiple flow lines may be carved in to a substrate and multiple channelled substrates may be stacked on top of one another. The ease with which one can scale up the process, merely by introducing additional coils, additional flow lines, multiple parallel stacked channels and the like, makes adoption of flow chemistry to solution polymerisation commercially very attractive.

Provided that the polymerisation reaction can occur within the flow reactor, there is no particular limitation regarding the material from which a flow line of the flow reactor is constructed. Generally, the flow reactor will comprise a flow line that is made from polymer, metal, glass (e.g. fused silica) or combinations thereof.

Examples of polymer from which a flow line/flow reactor can be constructed include perfluoroalkoxy polymer (PFA), fluorinated ethylene propylene (FEP), TEFLON, polyether ether ketone (PEEK), and polyethylene (PE).

Examples of suitable metals from which a flow line/flow reactor may be constructed include stainless steel, and other corrosion resistant metal alloys such as those sold under the trade name Hastelloy®.

Those skilled in the art will appreciate that RAFT polymerisation can be adversely effected by the presence of oxygen. The process of invention will therefore generally be conducted so as to minimise exposure of the reaction solution to oxygen. Accordingly, it may be desirable to select materials from which a flow line/flow reactor is to be constructed such that it has adequate oxygen barrier properties.

Thus, certain reactor types are less favourable for performing the present invention, either due to the material of fabrication or their geometry. For example, it has been found that thin-walled PFA tubing (1.6 mm OD/1.0 mm ID) inhibits the formation of RAFT polymers as a result of its high oxygen permeability, whereas stainless steel tubing with the same internal diameter (1.0 mm) and similar wall thickness allows for an effective polymerisation to take place.

Oxygen exposure can of course also be minimised by conducting the polymerisation under an inert atmosphere such as argon or nitrogen. Using an inert atmosphere in this way can enable the use of flow lines that have relatively poor oxygen barrier properties.

It has also been found that minimising the exposure of the reaction solution to oxygen can be effectively and efficiently be achieved by performing the present invention using microfluidic reactors. In particular, microfluidic reactors can be readily set up so as to minimise the reaction solutions exposure to oxygen.

Without regard to the oxygen permeability of the flow line, the reaction solution used in accordance with the invention can be readily depleted of oxygen using techniques know in the art. For example, the reaction solution (or solutions that are combined to from the reaction solution) may be sparged with an inert gas such as nitrogen or argon. Alternatively, the reaction solution (or solutions that are combined to from the reaction solution) may be passed through a degasser unit. In that case, the degasser may be conveniently located such that the reaction solution passes through it prior to the polymerisation being promoted. Conventional degassers such as those used in high pressure liquid chromatography (HPLC) applications may be conveniently employed in the present invention.

A convenient source of a flow line for use in a capillary tubular flow reactor is so called "microfluidic tubing". Such microfluidic tubing may be made from polymer or metal, such as those outlined above in respect of the flow lines, glass (e.g. fused silica), or combinations thereof.

To assist with describing the invention in more detail, reference will now be made to FIG. 1.

Figure 1:
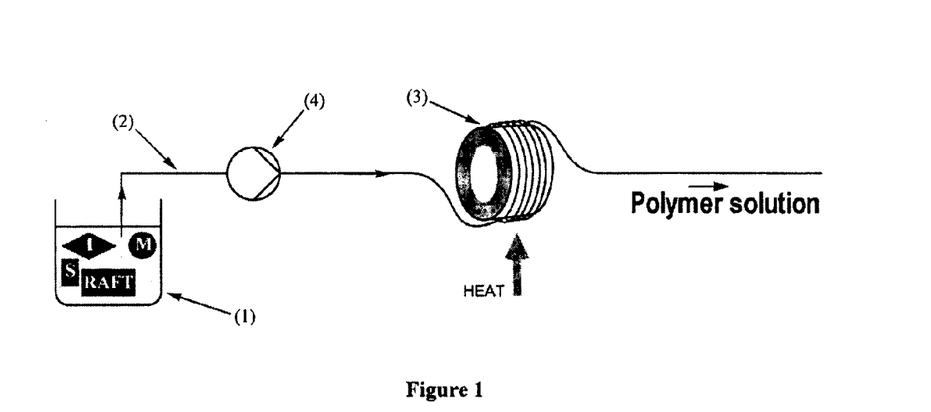
FIG. 1 shows a schematic illustration of the process according to the invention.

FIG. 1 shows a reaction solution comprising one or more ethylenically unsaturated monomers (M), RAFT agent (RAFT), non-reactive solvent (S) and free radical initiator (I) contained within a vessel (1). One or more of these reagents (M, RAFT, S, I) could of course be provided is a separate vessel such that multiple flow lines feed into the flow reactor and thereby deliver the reaction solution thereto. For example, the reaction solution may be introduced via three individual flow lines that merge into single main flow line that leads directly to the flow reactor, with each of the three individual flow lines drawing from three separate vessels that contain (M, S), (RAFT, S) and (I, S), respectively. Further detail in relation to the reaction solution is provided below.

The reaction solution is transferred via a flow line (2) and introduced into the flow reactor (3). The flow line (2) is of a tubular type herein described and in effect forms the flow reactor (3) by being shaped into a coil configuration. The distinction between the flow line (2) and the flow reactor (3) is that the flow reactor (3) is a designated section of the flow line (2) where polymerisation of the reaction solution is to be promoted. Further detail of means for promoting the polymerisation reaction is discussed below, but in the case of FIG. 1, an example of promoting the polymerisation reaction is shown by way of application of heat to the flow reactor (3).

The flow line (2) will be configured into a flow reactor (3) by winding the flow line (2) into a coil. The coiled section of the flow line (2) is then readily demarcated as the flow reactor (3).

Upon promoting polymerisation of the reaction solution within the flow reactor (3), a polymer solution is formed which subsequently flows out of the flow reactor (3).

Introducing the reaction solution into the flow reactor (3) can be facilitated by any suitable means, but this will generally be by action of a pump (4). Those skilled in the art will be able to select a suitable pump (4) for the purpose of transferring the reaction solution from the vessel (1) along the flow line (2) and introducing it to the flow reactor (3).

Figure 2:
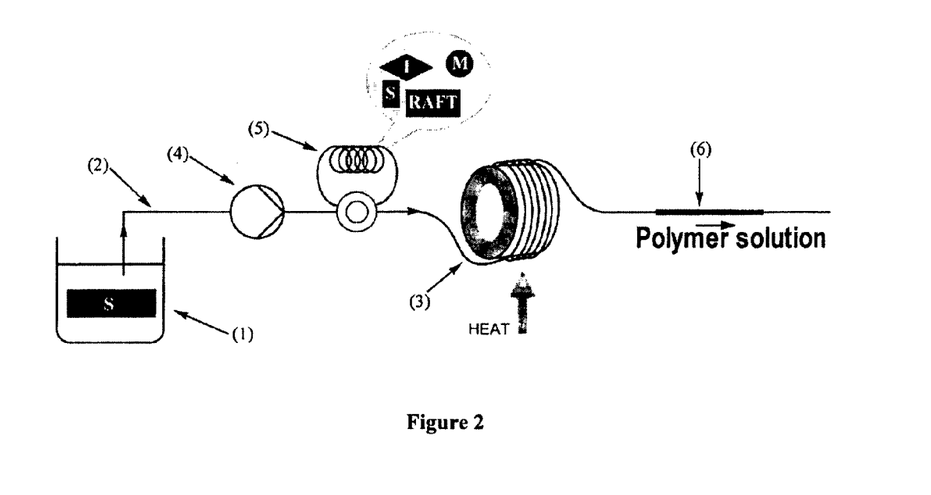
FIG. 2 shows a schematic illustration of the process according to the invention.

It will be appreciated that the process illustrated by FIG. 1 can be operated continuously by ensuring that vessel (1) is maintained with reaction solution. Multiple flow lines can of course also be used to form the flow reactor (3) so as to increase the volume of reaction solution drawn from vessel (1) and thereby increase the volume of polymer solution produced.

Where only a relatively small amount of polymer is to be produced for the purpose of development or optimisation of reaction conditions, the invention can conveniently be performed in a so called "segmented" flow mode using individual and separated "plugs" of reactions solution in small (analytical) volumes. This mode of operation is illustrated in FIG. 2. With reference to FIG. 2, the vessel (1), flow line (2), flow reactor (3) and pump (4) are the same as described above for FIG. 1. However, in this case the vessel (1) only comprises non-reactive solvent (S). The process is conducted by first introducing only non-reactive solvent (S) into the flow reactor (3). Reaction solution comprising one or more ethylenically unsaturated monomers (M), RAFT agent (RAFT), initiator (I) and optionally non-reactive solvent (S) is provided in the reaction solution loop (5) which can be isolated from the flow line (2) that leads to the flow reactor (3). At a suitable time the reaction solution loop (5) can be switched so as to release the reaction solution stored in the loop into the flow line (2) such that a "segment" or "plug" of the reaction solution is introduced into the flow reactor (3). The plug of reaction solution then undergoes polymerisation within the flow reactor (3) so as to form a polymer solution plug (6) that flows out of the flow reactor (3).

Those skilled in the art will appreciate that flow reactors of the type contemplated for use in accordance with the invention, particularly microfluidic flow reactors, are prone to high pressure build-up leading to system failure if the liquid within the flow line becomes highly viscous. For this reason, it is generally desired that reaction solutions typically formed in flow reactors, particularly microfluidic flow reactors, have a viscosity not much higher than that of water. As the viscosity of polymer solutions formed by solution polymerisation can be quite high, flow reactors, particularly microfluidic flow reactors, are not widely used for performing these types of polymerisation reactions.

Surprisingly, it has now been found that RAFT solution polymerisation can be efficiently and effectively performed in flow reactor systems.

When conducting the process of the invention, a pressure increase in the flow reactor is observed at the time when the reaction solution is polymerised and forms the polymer solution. However, the pressure increase can be managed through control of process variables such as concentration of monomer within the reaction solution and the rate of polymerisation, the likes of which can conveniently be controlled by the process flow rate.

When performing the present invention for the first time using a proposed reaction solution, it may be desirable to initially conduct a small scale batch-wise polymerisation of the reaction solution so as to obtain data, such as viscosity data of the resulting polymer solution, that, if necessary, can be used to adjust the composition and/or flow rate of the reaction solution that is to be used in accordance with the invention. For example, if the test batch-wise solution polymerisation affords polymer solution having too high viscosity, the concentration of monomer in the reaction solution could be lowered accordingly so that it is suitable for use in accordance with the invention.

In one embodiment of the invention, the composition of the reaction solution is determined based on data obtained from conducting a batch-wise polymerisation.

A batch-wise test polymerisation of a reaction solution proposed for use in accordance with the invention may be conveniently carried out on a relatively small scale (e.g. 2 ml) using a laboratory reactor heated by microwave irradiation.

Polymers prepared by RAFT polymerisation can exhibit a well defined molecular architecture. In particular, multiple RAFT polymerisation reactions can be conducted sequentially so as to provide for well defined block copolymers. The process according to the invention can be tailored to take advantage of this feature of RAFT polymerisation. For example, a polymer solution flowing out of a first flow reactor (or first flow reactor region) can be introduced into a second flow reactor (or second flow reactor region) along with ethylenically unsaturated monomer (typically different from that polymerised in the first reactor (region)) and free radical initiator. Polymerisation can then be promoted in the second flow reactor (or second flow reactor region) so as to form a block copolymer solution that flows out of the second flow reactor (or second flow reactor region).

Those skilled in the art will appreciate that the polymer solution formed in accordance with the invention will comprise RAFT polymer which itself can function as a macro-RAFT agent. Accordingly, the polymer solution may be used as a source of macro-RAFT agent to promote polymerisation of a "second" charge of monomer so as to conveniently form a block co-polymer. The process according to the present invention is particularly well suited to continuously preparing such block co-polymers.

By introducing the polymer solution into (a) a flow reactor, or (b) a "region" of a flow rector in the context of forming block copolymers is meant that (a) the polymer solution may be introduced into a different flow reactor from which it was prepared in order to undergo a second polymerisation, or (b) the polymer solution is prepared in a first part of a given flow reactor and the resulting polymer solution then progresses on to a region of the same rector where reaction solution is again introduced and a second polymerisation takes place. Generally, the flow reactor or the region of a flow rector into which the polymer solution is introduced will be coupled to the flow reactor into which the reaction solution is introduced. In other words, the so called "second stage" polymerisation can simply be conducted in a down stream section or region of the flow reactor in which the "first stage" polymerisation is conducted.

In one embodiment, the process further comprises introducing the polymer solution into a flow reactor or a region of a flow rector, together with a reaction solution comprising one or more ethylenically unsaturated monomers and free radical initiator; and promoting RAFT polymerisation of the one or more ethylenically unsaturated monomers within the reactor so as to form a block copolymer solution that flows out of the reactor.

If necessary, as part of the process of the invention, polymer solution formed within the reactor may be subject to purification. Possible unwanted reactants or products that may not be desirable in the polymer end product include unreacted monomer, unreacted initiators or byproducts. These may need to be separated from the end polymer depending on the purity requirements of the end polymer. This purification can conveniently be achieved by subjecting the polymer solution to an in-line purification technique (i.e. whereby the purification technique is integrated into the process).

The reaction solution used in accordance with the invention may comprise one or more ethylenically unsaturated monomers, RAFT agent, non-reactive solvent and free radical initiator.

Those skilled in the art will appreciate that for the one or more ethylenically unsaturated monomers to undergo RAFT polymerisation they must be of a type that can be polymerised by a free radical process. If desired, the monomers should also be capable of being polymerised with other monomers. The factors which determine copolymerisability of various monomers are well documented in the art. For example, see: Greenlee, R. Z., in Polymer Handbook $3^{rd}$ Edition (Brandup, J., and Immergut. E. H. Eds) Wiley: New York, 1989 p II/53.

Suitable ethylenically unsaturated monomers that may be used in accordance with the invention include those of formula (I):

(I)

where U and W are independently selected from $—CO_2H$, $—CO_2R^1$, $—COR^1$, $—CSR^1$, $—CSOR^1$, $—COSR^1$, $—CONH_2$, $—CONHR^1$, $—CONR^1_2$, hydrogen, halogen and optionally substituted $C_1$-$C_4$ alkyl or U and W form together a lactone, anhydride or imide ring that may itself be optionally substituted, where the optional substituents are independently selected from hydroxy, $—CO_2H$, $—CO_2R^1$, $—COR^1$, $—CSR^1$, $—CSOR^1$, $—COSR^1$, $—CN$, $—CONH_2$, $—CONHR^1$, $—CONR^1_2$, $—OR^1$, $—SR^1$, $—O_2CR^1$, $—SCOR^1$, and $—OCSR^1$;

V is selected from hydrogen, $R^1$, $—CO_2H$, $—CO_2R^1$, $—COR^1$, $—CSR^1$, $—CSOR^1$, $—COSR^1$, $—CONH_2$, $—CONHR^1$, $—CONR^1_2$, $—OR^1$, $—SR^1$, $—O_2CR^1$, $—SCOR^1$, and $—OCSR^1$;

where the or each $R^1$ is independently selected from optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted arylalkyl, optionally substituted heteroarylalkyl, optionally substituted alkylaryl, optionally substituted alkylheteroaryl, and an optionally substituted polymer chain.

The or each $R^1$ may also be independently selected from optionally substituted $C_1$-$C_{22}$ alkyl, optionally substituted $C_2$-$C_{22}$ alkenyl, optionally substituted $C_2$-$C_{22}$ alkynyl, optionally substituted $C_6$-$C_{18}$ aryl, optionally substituted $C_3$-$C_{18}$ heteroaryl, optionally substituted $C_3$-$C_{18}$ carbocyclyl, optionally substituted $C_2$-$C_{18}$ heterocyclyl, optionally substituted $C_7$-$C_{24}$ arylalkyl, optionally substituted $C_4$-$C_{18}$ heteroarylalkyl, optionally substituted $C_7$-$C_{24}$ alkylaryl, optionally substituted $C_4$-$C_{18}$ alkylheteroaryl, and an optionally substituted polymer chain.

$R^1$ may also be selected from optionally substituted $C_1$-$C_{18}$ alkyl, optionally substituted $C_2$-$C_{18}$ alkenyl, optionally substituted aryl, optionally substituted heteroaryl, optionally substituted carbocyclyl, optionally substituted heterocyclyl, optionally substituted aralkyl, optionally substituted heteroarylalkyl, optionally substituted alkaryl, optionally substituted alkylheteroaryl and a polymer chain.

In one embodiment, $R^1$ may be independently selected from optionally substituted $C_1$-$C_6$ alkyl.

Examples of optional substituents for $R^1$ include those selected from alkyleneoxidyl (epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, amino, including salts and derivatives thereof. Examples polymer chains include those selected from polyalkylene oxide, polyarylene ether and polyalkylene ether.

Examples of monomers of formula (I) include maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers.

Other examples of monomers of formula (I) include: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene and chloroprene. This list is not exhaustive.

RAFT agents suitable for use in accordance with the invention comprise a thiocarbonylthio group (which is a divalent moiety represented by: —C(S)S—). Examples of RAFT agents are described in Moad G.; Rizzardo, E; Thang S, H. Polymer 2008, 49, 1079-1131 (the entire contents of which are incorporated herein by reference) and include xanthate, dithioester, dithiocarbonate, dithiocarbanate and trithiocarbonate compounds, macro RAFT agents and switchable RAFT agents described in WO 10/83569.

A RAFT agent suitable for use in accordance with the invention may be represented by general formula (II) or (III):

where Z and R are groups, and R* and Z* are x-valent and y-valent groups, respectively, that are independently selected such that the agent can function as a RAFT agent in the polymerisation of one or more ethylenically unsaturated monomers; x is an integer ≥1; and y is an integer ≥2.

In order to function as a RAFT agent in the polymerisation of one or more ethylenically unsaturated monomers, those skilled in the art will appreciate that R and R* will typically be an optionally substituted organic group that function as a free radical leaving group under the polymerisation conditions employed and yet, as a free radical leaving group, retain the ability to reinitiate polymerisation. Those skilled in the art will also appreciate that Z and Z* will typically be an optionally substituted organic group that function to give a suitably high reactivity of the C=S moiety in the RAFT agent towards free radical addition without slowing the rate of fragmentation of the RAFT-adduct radical to the extent that polymerisation is unduly retarded.

In formula (II), R* is a x-valent group, with x being an integer ≥1. Accordingly, R* may be mono-valent, di-valent, tri-valent or of higher valency. For example, R* may be an optionally substituted polymer chain, with the remainder of the RAFT agent depicted in formula (II) presented as multiple groups pendant from the polymer chain. Generally, x will be an integer ranging from 1 to about 20, for example from about 2 to about 10, or from 1 to about 5.

Similarly, in formula (III), Z* is a y-valent group, with y being an integer ≥2. Accordingly, Z* may be di-valent, tri-valent or of higher valency. Generally, y will be an integer ranging from 2 to about 20, for example from about 2 to about 10, or from 2 to about 5.

Examples of R in RAFT agents used in accordance with the invention include optionally substituted, and in the case of R* in RAFT agents used in accordance with the invention include a x-valent form of optionally substituted: alkyl, alkenyl, alkynyl, aryl, acyl, carbocyclyl, heterocyclyl, heteroaryl, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, alkylthioaryl, alkenylthioaryl, alkynylthioaryl, arylthioaryl, arylacylthio, arylcarbocyclylthio, arylheterocyclylthio, arylheteroarylthio, and a polymer chain.

More specific examples of R in RAFT agents used in accordance with the invention include optionally substituted, and in the case of R* in RAFT agents used in accordance with the invention include an x-valent form of optionally substituted: $C_1$-$C_{18}$ alkyl, $C_2$-$C_{18}$ alkenyl, $C_2$-$C_{18}$ alkynyl, $C_6$-$C_{18}$ aryl, $C_1$-$C_{18}$ acyl, $C_3$-$C_{18}$ carbocyclyl, $C_2$-$C_{18}$ heterocyclyl, $C_3$-$C_{18}$ heteroaryl, $C_1$-$C_{18}$ alkylthio, $C_2$-$C_{18}$ alkenylthio, $C_2$-$C_{18}$ alkynylthio, $C_6$-$C_{18}$ arylthio. $C_1$-$C_{18}$ acylthio, $C_3$-$C_{18}$ carbocyclylthio, $C_2$-$C_{18}$ heterocyclylthio, $C_3$-$C_{18}$ heteroarylthio, $C_3$-$C_{18}$ alkylalkenyl, $C_3$-$C_{18}$ alkylalkynyl, $C_7$-$C_{24}$ alkylaryl, $C_2$-$C_{18}$ alkylacyl, $C_4$-$C_{18}$ alkylcarbocyclyl, $C_3$-$C_{18}$ alkylheterocyclyl, $C_4$-$C_{18}$ alkylheteroaryl, $C_2$-$C_{18}$ alkyloxyalkyl, $C_3$-$C_{18}$ alkenyloxyalkyl, $C_3$-$C_8$ alkynyloxyalkyl, $C_7$-$C_{24}$ aryloxyalkyl, $C_2$-$C_{18}$ alkylacyloxy, $C_2$-$C_{18}$ alkylthioalkyl, $C_3$-$C_{18}$ alkenylthioalkyl, $C_3$-$C_{18}$ alkynylthioalkyl, $C_7$-$C_{24}$ arylthioalkyl, $C_2$-$C_{18}$ alkylacylthio, $C_4$-$C_{18}$ alkylcarbocyclylthio, $C_3$-$C_{18}$ alkylheterocyclylthio, $C_4$-$C_{18}$ alkylheteroarylthio, $C_4$-$C_{18}$ alkylalkenylalkyl, $C_4$-$C_{18}$ alkylalkynylalkyl, $C_8$-$C_{24}$ alkylarylalkyl, $C_3$-$C_{18}$ alkylacylalkyl, $C_{13}$-$C_{24}$ arylalkylaryl, $C_{14}$-$C_{24}$ arylalkenylaryl, $C_{14}$-$C_{24}$ arylalkynylaryl, $C_{13}$-$C_{24}$ arylacylaryl, $C_7$-$C_{18}$ arylacyl, $C_9$-$C_{18}$ arylcarbocyclyl, $C_8$-$C_{18}$ arylheterocyclyl, $C_9$-$C_{18}$ arylheteroaryl, $C_8$-$C_{18}$ alkenyloxyaryl, $C_8$-$C_{18}$ alkynyloxyaryl, $C_{12}$-$C_{24}$ aryloxyaryl, alkylthioaryl, $C_8$-$C_{18}$ alkenylthioaryl, $C_8$-$C_{18}$ alkynylthioaryl, $C_{12}$-$C_{24}$ arylthioaryl, $C_7$-$C_{18}$ arylacylthio, $C_9$-$C_{18}$ arylcarbocyclylthio, $C_8$-$C_{18}$ arylheterocyclylthio, $C_9$-$C_{18}$ arylheteroarylthio, and a polymer chain having a number average molecular weight in the range of about 500 to about 80,000, for example in the range of about 500 to about 30,000

Where R in RAFT agents used in accordance with the invention include, and in the case of R* in RAFT agents used in accordance with the invention include an x-valent form of, an optionally substituted polymer chain, the polymers chain may be formed by any suitable polymerisation process such as radical, ionic, coordination, step-growth or condensation polymerisation. The polymer chains may comprise homopolymer, block polymer, multiblock polymer, gradient copolymer, or random or statistical copolymer chains and may have various architectures such as linear, star, branched, graft, or brush.

Examples of Z in RAFT agents used in accordance with the invention include optionally substituted, and in the case of Z* in RAFT agents used in accordance with the invention include a y-valent form of optionally substituted: F, Cl, Br, I, alkyl, aryl, acyl, amino, carbocyclyl, heterocyclyl, heteroaryl, alkyloxy, aryloxy, acyloxy, acylamino, carbocyclyloxy, heterocyclyloxy, heteroaryloxy, alkylthio, arylthio, acylthio, carbocyclylthio, heterocyclylthio, heteroarylthio, alkylaryl, alkylacyl, alkylcarbocyclyl, alkylheterocyclyl, alkylheteroaryl, alkyloxyalkyl, aryloxyalkyl, alkylacyloxy, alkylcarbocyclyloxy, alkylheterocyclyloxy, alkylheteroaryloxy, alkylthioalkyl, arylthioalkyl, alkylacylthio, alkylcarbocyclylthio, alkylheterocyclylthio, alkylheteroarylthio, alkylarylalkyl, alkylacylalkyl, arylalkylaryl, arylacylaryl, arylacyl, arylcarbocyclyl, arylheterocyclyl, arylheteroaryl, aryloxyaryl, arylacyloxy, arylcarbocyclyloxy, arylheterocyclyloxy, arylheteroaryloxy, alkylthioaryl, arylthioaryl, arylacylthio, arylcarbocyclylthio, arylheterocyclylthio, arylheteroarylthio, dialkyloxy-, diheterocyclyloxy- or diaryloxy-phosphinyl, dialkyl-, diheterocyclyl- or diaryl-phosphinyl, cyano (i.e. —CN), and —S—R, where R is as defined in respect of formula (III). More specific examples of Z in RAFT agents used in accordance with the invention include optionally substituted, and in the case of Z* in RAFT agents used in accordance with the invention include a y-valent form of optionally substituted: F, Cl, $C_1$-$C_{18}$ alkyl, $C_6$-$C_{18}$ aryl, $C_1$-$C_{18}$ acyl, amino, $C_3$-$C_{18}$ carbocyclyl, $C_2$-$C_{18}$ heterocyclyl, $C_3$-$C_{18}$ heteroaryl, $C_1$-$C_{18}$ alkyloxy, $C_6$-$C_{18}$ aryloxy, $C_1$-$C_{18}$ acyloxy, $C_3$-$C_{18}$ carbocyclyloxy, $C_2$-$C_{18}$ heterocyclyloxy, $C_3$-$C_{18}$ heteroaryloxy, $C_1$-$C_{18}$ alkylthio, $C_6$-$C_{18}$ arylthio, $C_1$-$C_{18}$ acylthio, $C_3$-$C_{18}$ carbocyclylthio, $C_2$-$C_{18}$ heterocyclylthio, $C_3$-$C_{18}$ heteroarylthio, $C_7$-$C_{24}$ alkylaryl, $C_2$-$C_{18}$ alkylacyl, $C_4$-$C_{18}$ alkylcarbocyclyl, $C_3$-$C_{18}$ alkylheterocyclyl, $C_4$-$C_{18}$ alkylheteroaryl, $C_2$-$C_{18}$ alkyloxyalkyl, $C_7$-$C_{24}$ aryloxyalkyl, $C_2$-$C_{18}$ alkylacyloxy, $C_4$-$C_{18}$ alkylcarbocyclyloxy, $C_3$-$C_{18}$ alkylheterocyclyloxy, $C_4$-$C_{18}$ alkylheteroaryloxy, $C_2$-$C_{18}$ alkylthioalkyl, $C_7$-$C_{24}$ arylthioalkyl, $C_2$-$C_{18}$ alkylacylthio, $C_4$-$C_{18}$ alkylcarbocyclylthio, $C_3$-$C_{18}$ alkylheterocyclylthio, $C_4$-$C_{18}$ alkylheteroarylthio, $C_8$-$C_{24}$ alkylarylalkyl, $C_3$-$C_{18}$ alkylacylalkyl, $C_{13}$-$C_{24}$ arylalkylaryl, $C_{13}$-$C_{24}$ arylacylaryl, $C_7$-$C_{18}$ arylacyl, $C_9$-$C_{18}$ arylcarbocyclyl, $C_8$-$C_{18}$ arylheterocyclyl, $C_9$-$C_{18}$ arylheteroaryl, $C_{12}$-$C_{24}$ aryloxyaryl, $C_7$-$C_{18}$ arylacyloxy, $C_9$-$C_{18}$ arylcarbocyclyloxy, $C_8$-$C_{18}$ arylheterocyclyloxy, $C_9$-$C_{18}$ arylheteroaryloxy, $C_7$-$C_{18}$ alkylthioaryl, $C_{12}$-$C_{24}$ arylthioaryl, $C_7$-$C_{18}$ arylacylthio, $C_9$-$C_{18}$ arylcarbocyclylthio, $C_8$-$C_{18}$ arylheterocyclylthio, $C_9$-$C_{18}$ arylheteroarylthio, dialkyloxy-, diheterocyclyloxy- or diaryloxy-phosphinyl (i.e. —P(=O)OR$^k_2$), dialkyl-, diheterocyclyl- or diaryl-phosphinyl (i.e. —P(=O)R$^k_2$), where R$^k$ is selected from optionally substituted $C_1$-$C_{18}$ alkyl, optionally substituted $C_6$-$C_{18}$ aryl, optionally substituted $C_2$-$C_{18}$ heterocyclyl, and optionally substituted $C_7$-$C_{24}$ alkylaryl, cyano (i.e. —CN), and —S—R, where R is as defined in respect of formula (III).

In one embodiment, the RAFT agent used in accordance with the invention is a trithiocarbonate RAFT agent and Z or Z* is an optionally substituted alkylthio group.

In the lists herein defining groups from which Z, Z*, R and R* may be selected, each group within the lists (e.g. alkyl, alkenyl, alkynyl, aryl, carbocyclyl, heteroaryl, heterocyclyl, and polymer chain moiety) may be optionally substituted. For avoidance of any doubt, where a given Z, Z*, R or R* contains two or more of such moieties (e.g. alkylaryl), each of such moieties may be optionally substituted with one, two, three or more optional substituents as herein defined.

In the lists herein defining groups from which Z, Z*, R and R* may be selected, where a given Z, Z*, R or R* contains two or more subgroups (e.g. [group A][group B]), the order of the subgroups is not intended to be limited to the order in which they are presented. Thus, a Z, Z*, R or R* with two subgroups defined as [group A][group B](e.g. alkylaryl) is intended to also be a reference to a Z, Z*, R or R* with two subgroups defined as [group B][group A](e.g. arylalkyl).

The Z, Z*, R or R* may be branched and/or optionally substituted. Where the Z, Z*, R or R* comprises an optionally substituted alkyl moiety, an optional substituent includes where a —$CH_2$— group in the alkyl chain is replaced by a group selected from —O—, —S—, —NR$^a$—, —C(O)— (i.e. carbonyl), —C(O)O— (i.e. ester), and —C(O)NR$^a$— (i.e. amide), where R$^a$ may be selected from hydrogen, alkyl, alkenyl, alkynyl, aryl, carbocyclyl, heteroaryl, heterocyclyl, arylalkyl, and acyl.

Reference herein to a x-valent, y-valent, multi-valent or di-valent "form of . . ." is intended to mean that the specified group is a x-valent, y-valent, multi-valent or di-valent radical, respectively. For example, where x or y is 2, the specified group is intended to be a divalent radical. In that case, a divalent alkyl group is in effect an alkylene group (e.g. —$CH_2$—). Similarly, the divalent form of the group alkylaryl may, for example, be represented by —($C_6H_4$)—$CH_2$—, a divalent alkylarylalkyl group may, for example, be represented by —$CH_2$—($C_6H_4$)—$CH_2$—, a divalent alkyloxy group may, for example, be represented by —$CH_2$—O—, and a divalent alkyloxyalkyl group may, for example, be represented by —$CH_2$—O—$CH_2$—. Where the term "optionally substituted" is used in combination with such a x-valent, y-valent, multi-valent or di-valent groups, that group may or may not be substituted or fused as herein described. Where the x-valent, y-valent, multi-valent, di-valent groups comprise two or more subgroups, for example [group A][group B][group C](e.g. alkylarylalkyl), if viable one or more of such subgroups may be optionally substituted. Those skilled in the art will appreciate how to apply this rationale in providing for higher valent forms.

The non-reactive solvent used in accordance with the invention functions primarily as an inert liquid carrier. By the solvent being "non-reactive" is meant that it does not undergo chemical reaction during the polymerisation process, or in other words it does not play an active role or participate in the polymerisation process per se. In addition to the solvent being selected for its property of being non-reactive in the context of the polymerisation reaction, it will also be selected for its ability to act as a solvent and dissolve at least the one or more ethylenically unsaturated monomers and the resulting polymer. Those skilled in the art will be able to readily select a solvent(s) for both its non-reactivity and salvation properties.

There is a vast array of non-reactive solvents that may be used in accordance with the invention. Examples of such solvents include, but are not limited to, acetone, acetonitrile. benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol dimethyl ether), 1,2-dimethoxyethane (glyme, DME), dimethylether, dimethyl-formamide (DMF), dimethyl sulfoxide (DMSO), dioxane, ethanol. ethyl acetate, ethylene glycol, glycerin, heptane, hexamethylphosphoramide (HMPA), hexamethylphosphorous triamide (HMPT), hexane, methanol, methyl t-butyl ether (MTBE), methylene chloride, N-methyl-2-pyrrolidinone (NMP), nitromethane, pentane, petroleum ether, 1-propanol, 2-propanol, pyridine, tetrahydrofuran (THF), toluene, triethyl amine, water, heavy water, o-xylene, m-xylene, p-xylene, and combinations thereof.

In order for the polymerisation to proceed, free radicals must be generated within the flow reactor. A source of initiating radicals can be provided by any suitable means of generating free radicals, such as by the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X- or gamma-radiation. The initiating system is chosen such that under the reaction conditions there is no substantial adverse interaction between the initiator or the initiating radicals and the components of the reaction solution under the conditions of the reaction. Where the initiating radicals are generated from monomer used in accordance with the invention, it will be appreciated that the monomer may be considered to be the free radical initiator. In other words, provided that the required free radicals are generated the present in inventions is not limited to a situation where a dedicated or primary functional free radical initiator must be used. The initiator selected should also have the requisite solubility in the non-reactive solvent.

Thermal initiators are generally chosen to have an appropriate half life at the temperature of polymerisation. These initiators can include one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine)dihydrochloride, 2,2'-azobis(2-amidinopropane)dihydrochloride, 2,2'-azobis(N,N'-dimethyleneisobutyramidine), 2,2'-azobis{2-methyl-N-[1,1-bis(hydroxymethyl)-2-hydroxyethyl] propionamide}, 2,2'-azobis {2-methyl-N-[1,1-bis (hydroxymethyl)-2-ethyl]propionamide}, 2,2'-azobis [2-methyl-N-(2-hydroxyethyl)propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are generally chosen to have an appropriate quantum yield for radical production under the conditions of the polymerisation. Examples include benzoin derivatives, benzophenone, acyl phosphine oxides, and photo-redox systems.

Redox initiator systems are generally chosen to have an appropriate rate of radical production under the conditions of the polymerisation; these initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in commonly available texts. See, for example, Moad and Solomon "the Chemistry of Free Radical Polymerisation", Pergamon, London, 1995, pp 53-95.

Initiators that are more readily solvated in hydrophilic media include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine)dihydrochloride, 2,2'-azobis(2-amidinopropane)dihydrochloride, 2,2'-azobis{2-methyl-N-[1,1-bis(hydroxymethyl)-2-ethyl]propionamide}, 2,2'-azobis[2-methyl-N-(2-hydroxyethyl)propionamide], 2,2'-azobis(isobutyramide)dihydrate, and derivatives thereof.

Initiators that are more readily solvated in hydrophobic media include azo compounds exemplified by the well known material 2,2'-azobisisobutyronitrile. Other suitable initiator compounds include the acyl peroxide class such as acetyl and benzoyl peroxide as well as alkyl peroxides such as cumyl and t-butyl peroxides. Hydroperoxides such as t-butyl and cumyl hydroperoxides are also widely used.

Selection of a given flow reactor will generally need to be done with regard to the manner in which the free radicals are to be generated. For example, if the free radicals are to be generated by the thermally induced homolytic scission of a suitable compound, the flow reactor will need to be selected such that heat can be applied to it in a manner that causes the temperature of reaction solution contained therein to be raised as required. Alternatively, if the free radicals are to be generated by a photochemical means, then the flow reactor should be selected such that it is suitably transparent to the photo initiating means. Those skilled in the art will be able to select an appropriate free radical initiator system for use with a given flow reactor system.

The feature of "promoting" RAFT polymerisation of the one or more ethylenically unsaturated monomers within the reactor according to the invention is therefore the act of generating free radicals within the reaction solution so as to initiate polymerisation of the monomers under the control of the RAFT agent. The means for "promoting" the polymerisation will vary depending upon the manner in which the radicals are to be generated. For example, if a thermal initiator is employed, polymerisation may be promoted by applying heat to the flow reactor. Alternatively, if a photo initiator is employed, polymerisation may be promoted by applying an appropriate wavelength of light to a suitably transparent flow reactor.

In one embodiment, RAFT polymerisation is promoted by applying heat to the flow reactor.

Upon promoting RAFT solution polymerisation of the one or more ethylenically unsaturated monomers within the reactor, a polymer solution is formed which flows out of the reactor. By "polymer solution" is meant polymer formed by the RAFT polymerisation that is dissolved in the non-reactive solvent.

The polymer solution per se may be collected for use, or the non-reactive solvent may be removed from the solution, for example by evaporation, so as to isolate the polymer per se. As used herein, the term "alkyl", used either alone or in compound words denotes straight chain, branched or cyclic alkyl, preferably $C_{1-20}$ alkyl, e.g. $C_{1-10}$ or $C_{1-6}$. Examples of straight chain and branched alkyl include methyl, ethyl, n-propyl, isopropyl, n-butyl, sec-butyl, t-butyl, n-pentyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methylhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyloctyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like. Where an alkyl group is referred to generally as "propyl", butyl" etc, it will be understood that this can refer to any of straight, branched and cyclic isomers where appropriate. An alkyl group may be optionally substituted by one or more optional substituents as herein defined.

The term "alkenyl" as used herein denotes groups formed from straight chain, branched or cyclic hydrocarbon residues containing at least one carbon to carbon double bond including ethylenically mono-, di- or polyunsaturated alkyl or cycloalkyl groups as previously defined, preferably $C_{2-20}$ alkenyl (e.g. $C_{2-10}$ or $C_{2-6}$). Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl. An alkenyl group may be optionally substituted by one or more optional substituents as herein defined.

As used herein the term "alkynyl" denotes groups formed from straight chain, branched or cyclic hydrocarbon residues containing at least one carbon-carbon triple bond including ethylenically mono-, di- or polyunsaturated alkyl or cycloalkyl groups as previously defined. Unless the number of carbon atoms is specified the term preferably refers to $C_{2-20}$ alkynyl (e.g. $C_{2-10}$ or $C_{2-6}$). Examples include ethynyl, 1-propynyl, 2-propynyl, and butynyl isomers, and pentynyl isomers. An alkynyl group may be optionally substituted by one or more optional substituents as herein defined.

The term "halogen" ("halo") denotes fluorine, chlorine, bromine or iodine (fluoro, chloro, bromo or iodo).

The term "aryl" (or "carboaryl") denotes any of single, polynuclear, conjugated and fused residues of aromatic hydrocarbon ring systems (e.g. $C_{6-24}$ or $C_{6-18}$). Examples of aryl include phenyl, biphenyl, terphenyl, quaterphenyl, naphthyl, tetrahydronaphthyl, anthracenyl, dihydroanthracenyl, benzanthracenyl, dibenzanthracenyl, phenanthrenyl, fluorenyl, pyrenyl, idenyl, azulenyl, chrysenyl. Preferred aryl include phenyl and naphthyl. An aryl group may or may not be optionally substituted by one or more optional substituents as herein defined. The term "arylene" is intended to denote the divalent form of aryl.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl.

The term "heteroatom" or "hetero" as used herein in its broadest sense refers to any atom other than a carbon atom which may be a member of a cyclic organic group. Particular examples of heteroatoms include nitrogen, oxygen, sulfur, phosphorous, boron, silicon, selenium and tellurium, more particularly nitrogen, oxygen and sulfur.

The term "heterocyclyl" when used alone or in compound words includes any of monocyclic, polycyclic, fused or conjugated hydrocarbon residues, preferably $C_{3-20}$ (e.g. $C_{3-10}$ or $C_{3-8}$) wherein one or more carbon atoms are replaced by a heteroatom so as to provide a non-aromatic residue. Suitable heteroatoms include O, N, S, P and Se, particularly O, N and S. Where two or more carbon atoms are replaced, this may be by two or more of the same heteroatom or by different heteroatoms. The heterocyclyl group may be saturated or partially unsaturated, i.e. possess one or more double bonds. Particularly preferred heterocyclyl are 5-6 and 9-10 membered heterocyclyl. Suitable examples of heterocyclyl groups may include azridinyl, oxiranyl, thiiranyl, azetidinyl, oxetanyl, thietanyl, 2H-pyrrolyl, pyrrolidinyl, pyrrolinyl, piperidyl, piperazinyl, morpholinyl, indolinyl, imidazolidinyl, imidazolinyl, pyrazolidinyl, thiomorpholinyl, dioxanyl, tetrahydrofuranyl, tetrahydropyranyl, tetrahydropyrrolyl, tetrahydrothiophenyl, pyrazolinyl, dioxalanyl, thiazolidinyl, isoxazolidinyl, dihydropyranyl, oxazinyl, thiazinyl, thiomorpholinyl, oxathianyl, dithianyl, trioxanyl, thiadiazinyl, dithiazinyl, trithianyl, azepinyl, oxepinyl, thiepinyl, indenyl, indanyl, 3H-indolyl, isoindolinyl, 4H-quinolazinyl, chromenyl, chromanyl, isochromanyl, pyranyl and dihydropyranyl. A heterocyclyl group may be optionally substituted by one or more optional substituents as herein defined. The term "heterocyclylene" is intended to denote the divalent form of heterocyclyl.

The term "heteroaryl" includes any of monocyclic, polycyclic, fused or conjugated hydrocarbon residues, wherein one or more carbon atoms are replaced by a heteroatom so as to provide an aromatic residue. Preferred heteroaryl have 3-20 ring atoms, e.g. 3-10. Particularly preferred heteroaryl are 5-6 and 9-10 membered bicyclic ring systems. Suitable heteroatoms include, O, N, S, P and Se, particularly O, N and S. Where two or more carbon atoms are replaced, this may be by two or more of the same heteroatom or by different heteroatoms. Suitable examples of heteroaryl groups may include pyridyl, pyrrolyl, thienyl, imidazolyl, furanyl, benzothienyl, isobenzothienyl, benzofuranyl, isobenzofuranyl, indolyl, isoindolyl, pyrazolyl, pyrazinyl, pyrimidinyl, pyridazinyl, indolizinyl, quinolyl, isoquinolyl, phthalazinyl, 1,5-naphthyridinyl, quinozalinyl, quinazolinyl, quinolinyl, oxazolyl, thiazolyl, isothiazolyl, isoxazolyl, triazolyl, oxadialzolyl, oxatriazolyl, triazinyl, and furazanyl. A heteroaryl group may be optionally substituted by one or more optional substituents as herein defined. The term "heteroarylene" is intended to denote the divalent form of heteroaryl.

The term "acyl" either alone or in compound words denotes a group containing the moiety C=O (and not being a carboxylic acid, ester or amide) Preferred acyl includes C(O)—$R^e$, wherein $R^e$ is hydrogen or an alkyl, alkenyl, alkynyl, aryl, heteroaryl, carbocyclyl, or heterocyclyl residue. Examples of acyl include formyl, straight chain or branched alkanoyl (e.g. $C_{1-20}$) such as acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; cycloalkylcarbonyl such as cyclopropylcarbonyl cyclobutylcarbonyl, cyclopentylcarbonyl and cyclohexylcarbonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl];

aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aryloxyalkanoyl such as phenoxyacetyl and phenoxypropionyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolyglyoxyloyl and thienylglyoxyloyl. The $R^e$ residue may be optionally substituted as described herein.

The term "sulfoxide", either alone or in a compound word, refers to a group —S(O)$R^f$ wherein $R^f$ is selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl.

The term "sulfonyl", either alone or in a compound word, refers to a group S(O)$_2$—$R^f$, wherein $R^f$ is selected from hydrogen, alkyl, alkenyl, alkynyl, aryl, heteroaryl, heterocyclyl, carbocyclyl and aralkyl. Examples of preferred $R^f$ include $C_{1-20}$alkyl, phenyl and benzyl.

The term "sulfonamide", either alone or in a compound word, refers to a group S(O)NR$^f$R$^f$ wherein each $R^f$ is independently selected from hydrogen, alkyl, alkenyl, alkynyl, aryl, heteroaryl, heterocyclyl, carbocyclyl, and aralkyl. Examples of preferred $R^f$ include $C_{1-20}$alkyl, phenyl and benzyl. In one embodiment at least one $R^f$ is hydrogen. In another embodiment, both $R^f$ are hydrogen.

The term, "amino" is used here in its broadest sense as understood in the art and includes groups of the formula NR$^a$R$^b$ wherein $R^a$ and $R^b$ may be any independently selected from hydrogen, alkyl, alkenyl, alkynyl, aryl, carbocyclyl, heteroaryl, heterocyclyl, arylalkyl, and acyl. $R^a$ and $R^b$, together with the nitrogen to which they are attached, may also form a monocyclic, or polycyclic ring system e.g. a 3-10 membered ring, particularly, 5-6 and 9-membered systems. Examples of "amino" include NH$_2$, NHalkyl (e.g. $C_{1-20}$alkyl), NHaryl (e.g. NHphenyl), NHaralkyl (e.g. NHbenzyl), NHacyl (e.g. NHC(O)$C_{1-20}$alkyl, NHC(O)phenyl), Nalkylalkyl (wherein each alkyl, for example $C_{1-20}$, may be the same or different) and 5 or 6 membered rings, optionally containing one or more same or different heteroatoms (e.g. O, N and S).

The term "amido" is used here in its broadest sense as understood in the art and includes groups having the formula C(O)NR$^a$R$^b$, wherein $R^a$ and $R^b$ are as defined as above.

Examples of amido include C(O)NH$_2$, C(O)NHalkyl (e.g. $C_{1-20}$alkyl), C(O)NHaryl (e.g. C(O)NHphenyl), C(O)NHaralkyl (e.g. C(O)NHbenzyl), C(O)NHacyl (e.g. C(O)NHC(O)$C_{1-20}$alkyl, C(O)NHC(O)phenyl), C(O)Nalkylalkyl (wherein each alkyl, for example $C_{1-20}$, may be the same or different) and 5 or 6 membered rings, optionally containing one or more same or different heteroatoms (e.g. O, N and S).

The term "carboxy ester" is used here in its broadest sense as understood in the art and includes groups having the formula CO$_2$R$^g$, wherein $R^g$ may be selected from groups including alkyl, alkenyl, alkynyl, aryl, carbocyclyl, heteroaryl, heterocyclyl, aralkyl, and acyl. Examples of carboxy ester include CO$_2$C$_{1-20}$alkyl, CO$_2$aryl (e.g. CO$_2$-phenyl), CO$_2$aralkyl (e.g. CO$_2$ benzyl).

As used herein, the term "aryloxy" refers to an "aryl" group attached through an oxygen bridge. Examples of aryloxy substituents include phenoxy, biphenyloxy, naphthyloxy and the like.

As used herein, the term "acyloxy" refers to an "acyl" group wherein the "acyl" group is in turn attached through an oxygen atom. Examples of "acyloxy" include hexylcarbonyloxy (heptanoyloxy), cyclopentylcarbonyloxy, benzoyloxy, 4-chlorobenzoyloxy, decylcarbonyloxy (undecanoyloxy), propylcarbonyloxy (butanoyloxy), octylcarbonyloxy (nonanoyloxy), biphenylcarbonyloxy (eg 4-phenylbenzoyloxy), naphthylcarbonyloxy (eg 1-naphthoyloxy) and the like.

As used herein, the term "alkyloxycarbonyl" refers to a "alkyloxy" group attached through a carbonyl group. Examples of "alkyloxycarbonyl" groups include butylformate, sec-butylformate, hexylformate, octylformate, decylformate, cyclopentylformate and the like. As used herein, the term "arylalkyl" refers to groups formed from straight or branched chain alkanes substituted with an aromatic ring. Examples of arylalkyl include phenylmethyl (benzyl), phenylethyl and phenylpropyl.

As used herein, the term "alkylaryl" refers to groups formed from aryl groups substituted with a straight chain or branched alkane. Examples of alkylaryl include methylphenyl and isopropylphenyl.

In this specification "optionally substituted" is taken to mean that a group may or may not be substituted or fused (so as to form a condensed polycyclic group) with one, two, three or more of organic and inorganic groups, including those selected from: alkyl, alkenyl, alkynyl, carbocyclyl, aryl, heterocyclyl, heteroaryl, acyl, aralkyl, alkaryl, alkheterocyclyl, alkheteroaryl, alkcarbocyclyl, halo, haloalkyl, haloalkenyl, haloalkynyl, haloaryl, halocarbocyclyl, haloheterocyclyl, haloheteroaryl, haloacyl, haloaryalkyl, hydroxy, hydroxyalkyl, hydroxyalkenyl, hydroxyalkynyl, hydroxycarbocyclyl, hydroxyaryl, hydroxyheterocyclyl, hydroxyheteroaryl, hydroxyacyl, hydroxyaralkyl, alkoxyalkyl, alkoxyalkenyl, alkoxyalkynyl, alkoxycarbocyclyl, alkoxyaryl, alkoxyheterocyclyl, alkoxyheteroaryl, alkoxyacyl, alkoxyaralkyl, alkoxy, alkenyloxy, alkynyloxy, aryloxy, carbocyclyloxy, aralkyloxy, heteroaryloxy, heterocyclyloxy, acyloxy, haloalkoxy, haloalkenyloxy, haloalkynyloxy, haloaryloxy, halocarbocyclyloxy, haloaralkyloxy, haloheteroaryloxy, haloheterocyclyloxy, haloacyloxy, nitro, nitroalkyl, nitroalkenyl, nitroalkynyl, nitroaryl, nitroheterocyclyl, nitroheteroayl, nitrocarbocyclyl, nitroacyl, nitroaralkyl, amino (NH$_2$), alkylamino, dialkylamino, alkenylamino, alkynylamino, arylamino, diarylamino, aralkylamino, diaralkylamino, acylamino, diacylamino, heterocyclamino, heteroarylamino, carboxy, carboxyester, amido, alkylsulphonyloxy, arylsulphenyloxy, alkylsulphenyl, arylsulphenyl, thio, alkylthio, alkenylthio, alkynylthio, arylthio, aralkylthio, carbocyclylthio, heterocyclylthio, heteroarylthio, acylthio, sulfoxide, sulfonyl, sulfonamide, aminoalkyl, aminoalkenyl, aminoalkynyl, aminocarbocyclyl, aminoaryl, aminoheterocyclyl, aminoheteroaryl, aminoacyl, aminoaralkyl, thioalkyl, thioalkenyl, thioalkynyl, thiocarbocyclyl, thioaryl, thioheterocyclyl, thioheteroaryl, thioacyl, thioaralkyl, carboxyalkyl, carboxyalkenyl, carboxyalkynyl, carboxycarbocyclyl, carboxyaryl, carboxyheterocyclyl, carboxyheteroaryl, carboxyacyl, carboxyaralkyl, carboxyesteralkyl, carboxyesteralkenyl, carboxyesteralkynyl, carboxyestercarbocyclyl, carboxyesteraryl, carboxyesterheterocyclyl, carboxyesterheteroaryl, carboxyesteracyl, carboxyesteraralkyl, amidoalkyl, amidoalkenyl, amidoalkynyl, amidocarbocyclyl, amidoaryl, amidoheterocyclyl, amidoheteroaryl, amidoacyl, amidoaralkyl, formylalkyl, formylalkenyl, formylalkynyl, formylcarbocyclyl, formylaryl, formylheterocyclyl, formylheteroaryl, formylacyl, formylaralkyl, acylalkyl, acylalkenyl, acylalkynyl, acylcarbocyclyl, acylaryl, acylheterocyclyl, acylheteroaryl, acylacyl, acylaralkyl, sulfoxidealkyl, sulfoxidealkenyl, sulfoxidealkynyl, sulfoxidecarbocyclyl, sulfoxidearyl, sulfoxideheterocyclyl, sulfoxideheteroaryl, sulfoxideacyl, sulfoxidearalkyl, sulfonylalkyl, sulfonylalkenyl, sulfonylalkynyl, sulfonylcarbocyclyl, sulfonylaryl, sulfonylheterocyclyl, sulfonylheteroaryl, sulfonylacyl, sulfonylaralkyl, sulfonamidoalkyl, sulfonamidoalkenyl, sulfonamidoalkynyl, sulfonamidocarbocyclyl, sulfonamidoaryl, sulfonamidoheterocyclyl, sulfonamidoheteroaryl, sulfonamidoacyl, sulfonamidoaralkyl, nitroalkyl, nitroalkenyl, nitroalkynyl, nitrocarbocyclyl, nitroaryl, nitroheterocyclyl, nitroheteroaryl, nitroacyl, nitroaralkyl, cyano, sulfate, phosphate, triarylmethyl, triarylamino, oxadiazole, and carbazole groups. Optional substitution may also be taken to refer to where a —CH$_2$— group in a chain or ring is replaced by a group selected from —O—, —S—, —NR$^a$—, —C(O)— (i.e. carbonyl), —C(O)O— (i.e. ester), and —C(O)NR$^a$— (i.e. amide), where R$^a$ is as defined herein.

Preferred optional substituents include alkyl, (e.g. $C_{1-6}$ alkyl such as methyl, ethyl, propyl, butyl, cyclopropyl, cyclobutyl, cyclopentyl or cyclohexyl), hydroxyalkyl (e.g. hydroxymethyl, hydroxyethyl, hydroxypropyl), alkoxyalkyl (e.g. methoxymethyl, methoxyethyl, methoxypropyl, ethoxymethyl, ethoxyethyl, ethoxypropyl etc) alkoxy (e.g. $C_{1-6}$ alkoxy such as methoxy, ethoxy, propoxy, butoxy, cyclopropoxy, cyclobutoxy), halo, trifluoromethyl, trichloromethyl, tribromomethyl, hydroxy, phenyl (which itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyl (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), phenoxy (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), benzyloxy (wherein benzyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), amino, alkylamino (e.g. $C_{1-6}$ alkyl, such as methylamino, ethylamino, propylamino etc), dialkylamino (e.g. $C_{1-6}$ alkyl, such as dimethylamino, diethylamino, dipropylamino), acylamino (e.g. NHC(O)CH$_3$), phenylamino (wherein phenyl itself may be further substituted e.g., by $C_{1-6}$ alkyl, halo, hydroxy, hydroxy$C_{1-6}$ alkyl, $C_{1-6}$ alkoxy, halo$C_{1-6}$ alkyl, cyano, nitro OC(O)$C_{1-6}$ alkyl, and amino), nitro, formyl, —C(O)-alkyl (e.g. $C_{1-6}$ alkyl, such as acetyl), O—C(O)-alkyl (e.g. $C_{1-6}$alkyl, such as acetyloxy), benzoyl (wherein the phenyl group itself may be further substituted e.g., by $C_{1-6}$ alkyl, halo, hydroxy hydroxy$C_{1-6}$ alkyl, $C_{1-6}$ alkoxy, halo$C_{1-6}$ alkyl, cyano, nitro OC(O)$C_{1-6}$alkyl, and amino), replacement of CH$_2$ with C=O, CO$_2$H, CO$_2$alkyl (e.g. $C_{1-6}$ alkyl such as methyl ester, ethyl ester, propyl ester, butyl ester), CO$_2$-phenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), CONH$_2$, CONHphenyl (wherein phenyl itself may be further substituted e.g., by $C_{1-6}$ alkyl, halo, hydroxy, hydroxyl $C_{1-6}$ alkyl, $C_{1-6}$ alkoxy, halo $C_{1-6}$ alkyl, cyano, nitro OC(O)$C_{1-6}$ alkyl, and amino), CONHbenzyl (wherein benzyl itself may be further substituted e.g., by $C_{1-6}$ alkyl, halo, hydroxy hydroxyl $C_{1-6}$ alkyl, $C_{1-6}$ alkoxy, halo $C_{1-6}$ alkyl, cyano, nitro OC(O)$C_{1-6}$ alkyl, and amino), CONHalkyl (e.g. $C_{1-6}$ alkyl such as methyl ester, ethyl ester, propyl ester, butyl amide) CONHdialkyl (e.g. $C_{1-6}$ alkyl)aminoalkyl (e.g., HN $C_{1-6}$ alkyl-, $C_{1-6}$alkylHN—$C_{1-6}$ alkyl- and ($C_{1-6}$ alkyl)$_2$N—$C_{1-6}$ alkyl-), thioalkyl (e.g., HS $C_{1-6}$ alkyl-), carboxyalkyl (e.g., HO$_2$CC$_{1-6}$ alkyl-), carboxyesteralkyl (e.g., $C_{1-6}$ alkylO$_2$CC$_{1-6}$ alkyl-), amidoalkyl (e.g., H$_2$N(O)CC$_{1-6}$ alkyl-, H(C$_{1-6}$ alkyl)N(O)CC$_{1-6}$ alkyl-), formylalkyl (e.g., OHCC$_{1-6}$alkyl-), acylalkyl (e.g., $C_{1-6}$ alkyl(O)CC$_{1-6}$ alkyl-), nitroalkyl (e.g., O$_2$NC$_{1-6}$ alkyl-), sulfoxidealkyl (e.g., R(O)SC$_{1-6}$ alkyl, such as $C_{1-6}$ alkyl(O)SC$_{1-6}$ alkyl-), sulfonylalkyl (e.g., R(O)$_2$SC$_{1-6}$ alkyl- such as $C_{1-6}$ alkyl(O)$_2$SC$_{1-6}$ alkyl-), sulfonamidoalkyl (e.g., $_2$HRN(O)SC$_{1-6}$ alkyl, H(C$_{1-6}$ alkyl)N(O)SC$_{1-6}$ alkyl-), triarylmethyl, triarylamino, oxadiazole, and carbazole.

The invention will now be described with reference to the following non-limiting examples.

EXAMPLES

Materials, Equipment and Operation Methods

Polymerisations were performed in a commercially available tubular flow reactor (Vapourtec R2/R4 reactor heater), which allows continuous flow processing up to 250° C. Two different flow reactor systems were investigated: a polymer coil made from perfluoroalkoxy polymer (PFA) tubing, and a stainless steel coil, both with an internal diameter of 1 mm and a total volume of 10 ml.

Flow reactions were performed in one of two different modes. For library synthesis, small amounts of starting material, (monomer, initiator and RAFT agent) were processed in a series of plugs injected via a sample loop into a constant solvent stream. This mode, which herein is referred to as "segmented flow", is generally suitable for processing several small samples in succession, with the goal to synthesise samples in practicable analytical quantities. Within this work, segmented flow has been used on a scale of 2 ml per sample.

The second mode applied for the RAFT polymerisation in the tubular reactors was where solvent, monomer, initiator and RAFT agent was continuously introduced to the flow reactor for the production of several grams of polymer. Here samples of typically >10 ml were processed under steady state conditions.

In both modes, starting material solutions were premixed and degassed. The reactions were performed at temperatures between 70° C. and 100° C. and flow rates between 0.08 and 0.33 ml/min resulting in reaction times of 30 min to 120 min. A series of different monomers (compounds 1-4 shown below), initiators (compounds 5-6 shown below), and RAFT agents (compounds 7-8 shown below) were used for batch and flow polymerizations.

23
-continued

Batch experiments were carried out on a laboratory reactor heated by microwave irradiation (Biotage Initiator) on a 2 ml scale, using the same preparation and degassing protocols as the flow experiments.

Initiators 5 and 6 were purchased from Acros and Dupont, respectively. RAFT agent 7 was synthesized in house and RAFT agent 8 was obtained from Sigma Aldrich. Monomers 2 to 4 were pre-treated using polymer resin (inhibitor remover from Sigma Aldrich) in order to remove the polymerization inhibitor. Solvents were obtained from commercial suppliers and were used without further purification.

Conversions were calculated from $^1$H-NMR spectra using 1,3,5-trioxane as an internal standard. $^1$H NMR spectra were recorded on a Bruker AC-400 spectrometer in deuterated chloroform (solvent residual as internal reference: δ=7.26 ppm). Average molecular weight of the polymer, $\overline{M}_n$, and its polydispersity index, PDI, were measured using gel permeation chromatography (GPC). PDI was calculated from experimental data using equation 1.

$$PDI = \frac{\overline{M}_w}{\overline{M}_n} = \frac{\sum w_i M_i / \sum w_i}{\sum n_i M_i / \sum n_i} = \frac{\sum n_i M_i^2 / \sum n_i M_i}{\sum n_i M_i / \sum n_i} \quad (1)$$

Here $\overline{M}_w$ is the weight average molecular weight, $\overline{M}_n$ is the number average molecular weight and $w_i$, $n_i$ and $M_i$ are the weight, number and molecular weight of chains of length i respectively. GPC of polymers from 1 and 2 was performed on a system comprising a Waters 590 HPLC pump and a Waters 410 refractive index detector equipped with 3× Waters Styragel columns (HT2, HT3, HT4, each 300 mm×7.8 mm providing an effective molecular weight range of 100-600000). The eluent was N,N-dimethylformamide (DMF) (containing 0.45% w/v LiBr) at 80° C. (flow rate: 1 ml/min). GPC of polymers from 3 and 4 was performed on a system using a Waters 2695 Separation Module. Tetrahydrofuran (1.0 ml/min) was used as eluent. The GPCs were calibrated with narrow dispersity polystyrene standards, and molecular weights are reported as polystyrene equivalents. $\overline{M}_n$ and $\overline{M}_w$ were evaluated using Waters Millennium software. A polynomial was used to fit the log M vs. time calibration curve, which was linear across the molecular weight ranges.

Example 1

Figure 3:
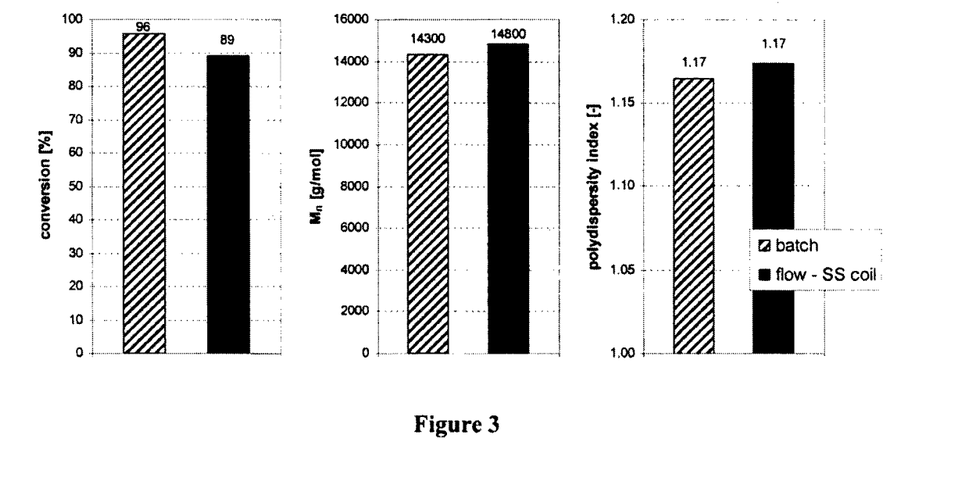
FIG. 3 shows a comparison of reactor performance in two different reactors for a RAFT polymerization: comparative batch microwave reactor (black and white stripes), steel tubing reactor (black), left graph: conversion, centre graph: average molecular weight, right graph: polydispersity index. All flow experiments that were carried out in the polymeric material, perfluoroalkoxy polymer (PFA), continuous flow reactor did not result in any polymer product.

Evaluation of Different Reactor Materials (Polymer or Steel Tubing) for Continuous RAFT Polymerization Process RAFT Polymerization of N,N-dimethylacrylamide, 2, in Batch (Comparative) and Continuous Flow Using a PFA Polymer or a Steel Flow Reactor Coil A starting material solution of 1630 mg monomer, 2, 18 mg initiator, 5, 44 mg RAFT agent, 7, in 8 ml ethyl acetate (EtOAc), was premixed and degassed using 3 pump freeze thawing cycles. The process solvent used for the continuous flow scenarios was degassed using nitrogen purging. The polymerization was conducted at 80° C. with a reaction time of 2 h. For batch processing, 2 ml of starting material solution were processed on a laboratory microwave reactor (Biotage Initiator). For continuous flow, 2 ml of starting material solution were injected into a constant solvent stream (EtOAc) at 0.08 ml/min on a Vapourtec R2/R4 reactor heater, using either a PFA polymer coil or a stainless steel coil (10 ml each). A yellow viscous polymer solution was obtained after reaction. The structure of the polymer was confirmed by NMR. Comparison between batch glass reactor vessel and the steel flow reactor are shown in FIG. 3. The experiments carried out in the PFA flow reactor did not result in any polymer product, which can be attributed to the adverse oxygen permeability of the PFA tubing, (oxygen ingress stops any radical activity).

Example 2

Figure 4:
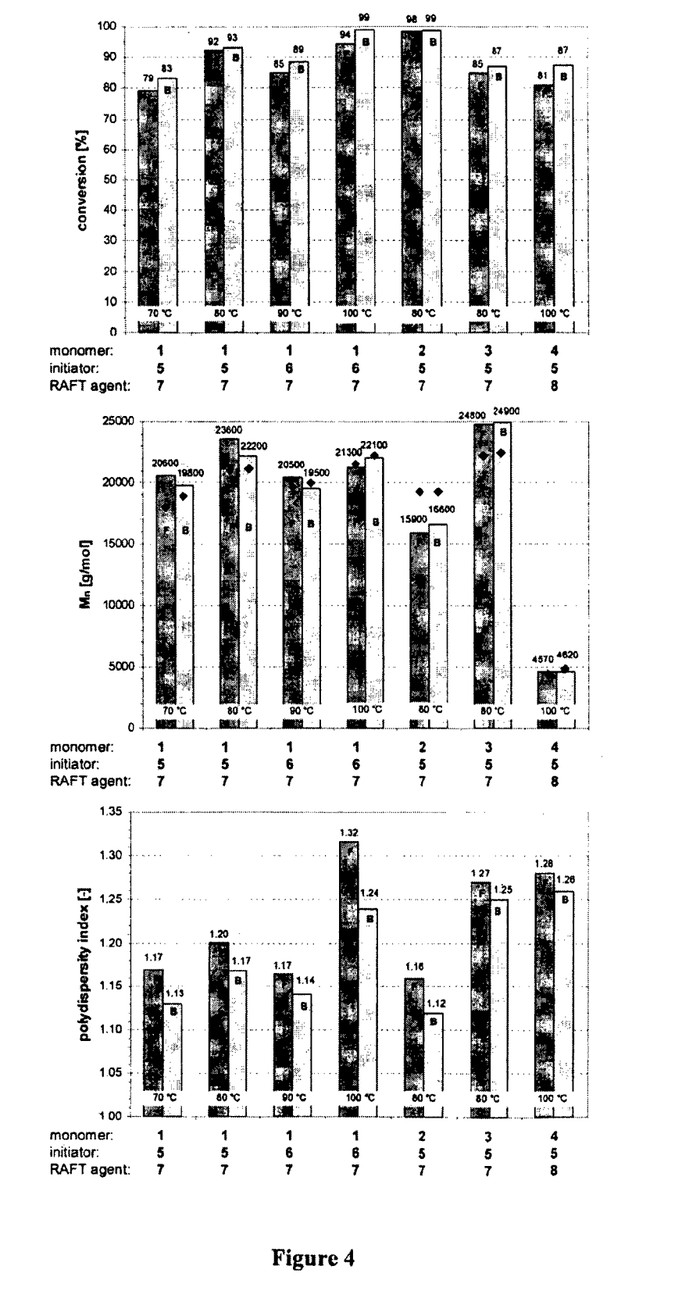
FIG. 4 shows data from RAFT polymers synthesized in batch (comparative) and continuous flow after 2 h reaction time, four different monomers, 1 to 4 polymerized at temperatures between 70 and 100° C., comparison between continuous flow (left columns—F) and batch (right columns—B), top: conversion, centre: average molecular weight (columns—experimental values/black diamonds—theoretical values), bottom: polydispersity index.

Evaluation of Flow Process for a Series of Different Monomers, RAFT Agents and Solvents & Comparison to Batch Processing RAFT Polymerization of N-isopropylacrylamide, 1, in Batch (Comparative) and Continuous Flow Using a Steel Flow Reactor Coil A starting material solution of 2037 mg monomer, 1, 8.8 mg initiator, 5, 37 mg RAFT agent, 7, in 10 ml EtOAc, was premixed and degassed using nitrogen purging. The washing and process solvent for continuous flow mode were also degassed using nitrogen. The polymerizations were conducted at 80° C. with a reaction time of 2 h. For batch processing, 2 ml of starting material solution was processed on a laboratory microwave reactor (Biotage Initiator). For continuous flow experiments, the remaining starting material solution was processed at a flow rate of 0.08 ml/min on a Vapourtec R2/R4 reactor heater, using a 10 ml stainless steel coil. A yellow viscous polymer solution was obtained after reaction. The structure of the polymer was confirmed by NMR. This general procedure was used for the monomers 1 to 4 in combination with initiators 5 or 6 and RAFT agents 7 or 8, with certain alterations to the process conditions (temperature and process flow rate), depending on the monomer, RAFT agent and initiator used (sees FIG. 4).

Example 3

Influence of Tubing Diameter on the Continuous RAFT Polymerization Process

RAFT Polymerization of N,N-dimethylacrylamide, 2, in Batch (Comparative) and Continuous Flow Using Either Two 10 ml Steel Flow Reactor Coils (ID=1 mm) in Series or One 20 ml Steel Flow Reactor Coil (ID=2.2 mm)

Figure 5:
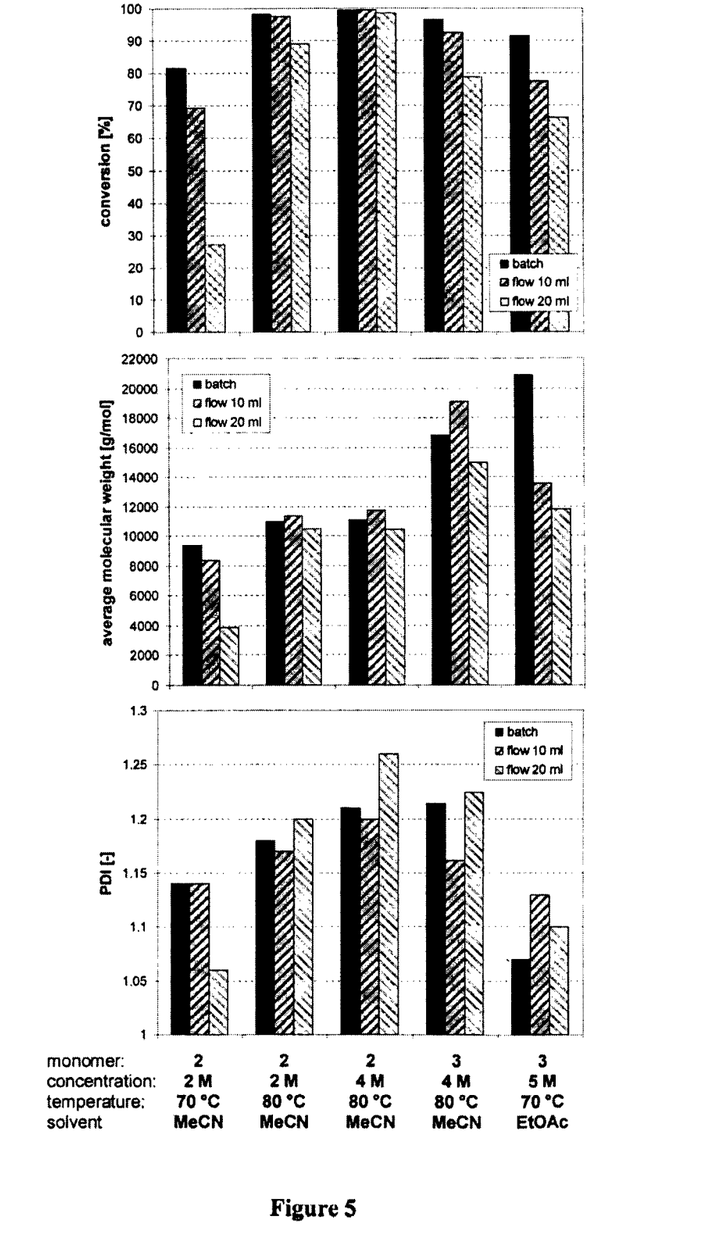
FIG. 5 shows the influence of tubing diameter on the continuous RAFT polymerization process in three different reactors: comparative batch microwave reactor (black), steel tubing reactor with i.d.=1 mm configured from 2×10 ml reactors (black and grey stripes), and steel tubing reactor with i.d.=2.2 mm configured from 1×20 ml reactor (black and white stripes), top graph: conversion, centre graph: average molecular weight, bottom graph: polydispersity index.

A starting material solution of 8723 mg monomer, 2, 43 mg initiator, 5, 426 mg RAFT agent, 7, in 13 ml acetonitrile (MeCN), was premixed and degassed using nitrogen purging. The washing solvent for continuous flow mode was also degassed using nitrogen. The polymerisations were conducted at 80° C. with a reaction time of 1 h. For batch processing, 2 ml of starting material solution were processed on a laboratory microwave reactor (Biotage Initiator). For continuous flow, a total of 10 ml of starting material solution were processed in either of the two configurations (2×10 ml coil, 1×20 ml coil) at a flow rate of 0.33 ml/min on a Vapourtec R2/R4 reactor heater. A yellow viscous polymer solution was obtained after reaction. This general procedure was used for all entries in FIG. 5 with the noted alterations to the process conditions.

Example 4

Scale-up of Continuous RAFT Polymerization Process

RAFT Polymerization of N,N-dimethylacrylamide, 2, in Continuous Flow Using Three 10 ml Steel Flow Reactor Coils (ID=1 mm) and One 20 ml Steel Flow Reactor Coil (ID=2.2 mm) in Series (Total Reactor Volume=50 ml)

A starting material solution of 237.91 g monomer, 2, 394 mg initiator, 5, 12.595 g RAFT agent, 7, in 153 ml MeCN, was premixed and degassed using nitrogen purging. The polymerisation was conducted at 75° C. with a reaction time of 30 min and a flow rate of 1.67 ml/min on a Vapourtec R2/R4 reactor heater. A yellow, highly viscous polymer solution was obtained after reaction. The reaction resulted in 94% conversion, and the polymer had an average molecular weight of 9360 g/mol and a PDI of 1.24.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Many modifications will be apparent to those skilled in the art without departing from the scope of the present invention.

The invention claimed is:

1. A process for continuously preparing polymer by RAFT solution polymerisation, the process comprising:
introducing a reaction solution comprising one or more ethylenically unsaturated monomers, RAFT agent, non-reactive solvent and free radical initiator into bundled flow lines or a coiled flow line of a tubular flow reactor; and
promoting RAFT polymerisation of the one or more ethylenically unsaturated monomers within the tubular flow reactor so as to form a polymer solution that flows out of the tubular flow reactor.

2. The process according to claim 1, wherein the tubular flow reactor is in the form of a capillary tubular flow reactor.

3. The process according to claim 1, wherein the bundled or coiled flow lines have an internal diameter of no more than 2.2 mm.

4. The process according to claim 1, wherein the bundled or coiled flow lines have an internal diameter of no more than 1 mm.

5. The process according to claim 1, wherein the bundled or coiled flow lines are made of metal.

6. The process according to claim 1 which further comprises introducing the resulting polymer solution into a flow reactor or a region of a flow reactor, together with a reaction solution comprising one or more ethylenically unsaturated monomers and free radical initiator; and
promoting RAFT polymerisation of the one or more ethylenically unsaturated monomers within the reactor so as to form a block copolymer solution that flows out of the reactor.

7. The process according to claim 6, wherein the flow reactor or the region of a flow reactor into which the resulting polymer solution is introduced is coupled to the tubular flow reactor into which the reaction solution is introduced.

8. The process according to claim 1, wherein the RAFT polymerisation is promoted by applying heat to the tubular flow reactor.

9. The process according to claim 1, wherein RAFT agent is represented by general formula (II) or (III):

where Z and R are groups, and R* and Z* are x-valent and y-valent groups, respectively, that are independently selected such that the agent can function as a RAFT agent in the polymerisation of the one or more ethylenically unsaturated monomers; x is an integer ≥1; and y is an integer ≥2.

10. The process according to claim 9, wherein R is selected from optionally substituted, and in the case of R* a x-valent form of optionally substituted: alkyl, alkenyl, alkynyl, aryl, acyl, carbocyclyl, heterocyclyl, heteroaryl, alkylthio, alkenylthio, alkynylthio, arylthio, acylthio, carbocyclylthio, heterocyclylthio, heteroarylthio, alkylalkenyl, alkylalkynyl, alkylaryl, alkylacyl, alkylcarbocyclyl, alkylheterocyclyl, alkylheteroaryl, alkyloxyalkyl, alkenyloxyalkyl, alkynyloxyalkyl, aryloxyalkyl, alkylacyloxy, alkylcarbocyclyloxy, alkylheterocyclyloxy, alkylheteroaryloxy, alkylthioalkyl, alkenylthioalkyl, alkynylthioalkyl, arylthioalkyl, alkylacylthio, alkylcarbocyclylthio, alkylheterocyclylthio, alkylheteroarylthio, alkylalkenylalkyl, alkylalkynylalkyl, alkylarylalkyl, alkylacylalkyl, arylalkylaryl, arylalkenylaryl, arylalkynylaryl, arylacylaryl, arylacyl, arylcarbocyclyl, arylheterocyclyl, arylheteroaryl, alkenyloxyaryl, alkynyloxyaryl, aryloxyaryl, alkylthioaryl, alkenylthioaryl, alkynylthioaryl, arylthioaryl, arylacylthio, arylcarbocyclylthio, arylheterocyclylthio, arylheteroarylthio, and a polymer chain.

11. The process according to claim 9, wherein Z is selected from optionally substituted, and in the case of Z* a y-valent form of optionally substituted: F, Cl, Br, I, alkyl, aryl, acyl, amino, carbocyclyl, heterocyclyl, heteroaryl, alkyloxy, aryloxy, acyloxy, acylamino, carbocyclyloxy, heterocyclyloxy, heteroaryloxy, alkylthio, arylthio, acylthio, carbocyclylthio, heterocyclylthio, heteroarylthio, alkylaryl, alkylacyl, alkylcarbocyclyl, alkylheterocyclyl, alkylheteroaryl, alkyloxyalkyl, aryloxyalkyl, alkylacyloxy, alkylcarbocyclyloxy, alkylheterocyclyloxy, alkylheteroaryloxy, alkylthioalkyl, arylthioalkyl, alkylacylthio, alkylcarbocyclylthio, alkylheterocyclylthio, alkylheteroarylthio, alkylarylalkyl, alkylacylalkyl, arylalkylaryl, arylacylaryl, arylacyl, arylcarbocyclyl, arylheterocyclyl, arylheteroaryl, aryloxyaryl, arylacyloxy, arylcarbocyclyloxy, arylheterocyclyloxy, arylheteroaryloxy, alkylthioaryl, arylthioaryl, arylacylthio, arylcarbocyclylthio, arylheterocyclylthio, arylheteroarylthio, dialkyloxy-, diheterocyclyloxy- or diaryloxy- phosphinyl, dialkyl-, diheterocyclyl- or diaryl- phosphinyl, cyano (i.e. —CN), and —S—R, where R is as defined in claim 9.

12. The process according to claim 1, wherein the reaction solution is degassed to remove oxygen prior to polymerisation being promoted.

13. The process according to claim 9, wherein Z is selected from optionally substituted, and in the case of Z* a y-valent form of optionally substituted: F, Cl, Br, I, alkyl, aryl, acyl, amino, carbocyclyl, heterocyclyl, heteroaryl, alkyloxy, aryloxy, acyloxy, acylamino, carbocyclyloxy, heterocyclyloxy, heteroaryloxy, alkylthio, arylthio, acylthio, carbocyclylthio, heterocyclylthio, heteroarylthio, alkylaryl, alkylacyl, alkylcarbocyclyl, alkylheterocyclyl, alkylheteroaryl, alkyloxyalkyl, aryloxyalkyl, alkylacyloxy, alkylcarbocyclyloxy, alkylheterocyclyloxy, alkylheteroaryloxy, alkylthioalkyl, arylthioalkyl, alkylacylthio, alkylcarbocyclylthio, alkylheterocyclylthio, alkylheteroarylthio, alkylarylalkyl, alkylacylalkyl, arylalkylaryl, arylacylaryl, arylacyl, arylcarbocyclyl, arylheterocyclyl, arylheteroaryl, aryloxyaryl, arylacyloxy, arylcarbocyclyloxy, arylheterocyclyloxy, arylheteroaryloxy, alkylthioaryl, arylthioaryl, arylacylthio, arylcarbocyclylthio, arylheterocyclylthio, arylheteroarylthio, dialkyloxy-, diheterocyclyloxy- or diaryloxy- phosphinyl, dialkyl-, diheterocyclyl- or diaryl- phosphinyl, cyano (i.e. —CN), and —S—R, where R is as defined in claim 10.

* * * * *